United States Patent
Pawlak

(10) Patent No.: US 10,104,736 B2
(45) Date of Patent: Oct. 16, 2018

(54) METHOD FOR CONTROLLING AT LEAST ONE LIGHT BARRIER, CONTROL CIRCUIT AND THUS EQUIPPED SELF-SERVICE TERMINAL

(71) Applicant: Wincor Nixdorf International GmbH, Paderborn (DE)

(72) Inventor: Thorsten Pawlak, Altenbeken (DE)

(73) Assignee: Wincor Nixdorf International GmbH, Paderborn (DE)

( * ) Notice: Subject to any disclaimer, the term of this patent is extended or adjusted under 35 U.S.C. 154(b) by 103 days.

(21) Appl. No.: 15/050,495

(22) Filed: Feb. 23, 2016

(65) Prior Publication Data
US 2016/0255696 A1    Sep. 1, 2016

(30) Foreign Application Priority Data

Feb. 26, 2015 (EP) ..................................... 15156769

(51) Int. Cl.
*G01V 8/12* (2006.01)
*H05B 33/08* (2006.01)

(52) U.S. Cl.
CPC .......... *H05B 33/0851* (2013.01); *G01V 8/12* (2013.01)

(58) Field of Classification Search
None
See application file for complete search history.

(56) References Cited

U.S. PATENT DOCUMENTS 5,155,350 A * 10/1992 Ottleben .................. G01V 8/12
                                                              250/205
5,336,882 A *  8/1994 Fooks ..................... G01S 7/497
                                                              250/214 B
(Continued)

FOREIGN PATENT DOCUMENTS

DE    42 37 311        12/1993
DE    43 24 590         1/1995
(Continued)

OTHER PUBLICATIONS

European Search Report dated Aug. 11, 2015.

*Primary Examiner* — Jimmy Vu
*Assistant Examiner* — Laura Yesildag
(74) *Attorney, Agent, or Firm* — Black, McCuskey, Souers & Arbaugh, LPA

(57) ABSTRACT

A method controls a light barrier where light is emitted from an optical transmitter to an optical receiver. The method checks whether reception levels fall below a lower threshold or exceed an upper threshold to determine whether the light barrier is interrupted. The thresholds initially are adjusted based on a predetermined minimum reception level, with each threshold being a fraction of the minimum reception level. An allowable reception level range is defined between the minimum level and a predetermined saturation level. The method checks whether the current reception level is outside the allowable reception level range, and, if this is the case, calibrates a parameter for operating the optical transmitter based on the minimum reception level and/or the saturation reception level. The parameter is calibrated by calculating a gradient of one characteristic curve of the light barrier and readjusting the parameter to a target value calculated based on the gradient.

14 Claims, 7 Drawing Sheets

(56) References Cited

U.S. PATENT DOCUMENTS

| | | | | | |
|---|---|---|---|---|---|
| 5,532,472 | A | * | 7/1996 | Furuta | H03K 17/941 |
| | | | | | 250/205 |
| 5,621,205 | A | * | 4/1997 | Warner | G01J 1/32 |
| | | | | | 250/205 |
| 6,121,605 | A | * | 9/2000 | Blumcke | G01V 8/12 |
| | | | | | 250/221 |
| 6,882,411 | B2 | * | 4/2005 | Dispenza | G01M 11/0278 |
| | | | | | 356/124 |
| 7,244,917 | B2 | * | 7/2007 | Tsukigi | G01J 1/32 |
| | | | | | 250/205 |
| 2004/0016870 | A1 | * | 1/2004 | Pawlicki | B60K 31/0008 |
| | | | | | 250/208.1 |

FOREIGN PATENT DOCUMENTS

| | | |
|---|---|---|
| DE | 100 38 025 | 3/2002 |
| DE | 10 2005 047 337 | 11/2006 |
| EP | 0 418 989 | 3/1991 |
| EP | 0 891 044 | 1/1999 |

\* cited by examiner

METHOD FOR CONTROLLING AT LEAST ONE LIGHT BARRIER, CONTROL CIRCUIT AND THUS EQUIPPED SELF-SERVICE TERMINAL

BACKGROUND

1. Field of the Invention

The invention relates to a method for controlling at least one light barrier where light is emitted from an optical transmitter to an optical receiver. A current reception level is determined in dependence from the received light. A control circuit is used to check whether the current reception level falls below a lower threshold or exceeds an upper threshold to determine whether the light barrier is interrupted or not. The invention also relates to a thus operating control circuit and further to a thus equipped self-service terminal. In particular, the invention relates to a method for controlling light barriers equipped with photo sensors for implementation into a self-service terminal.

2. Description of the Related Art

A light barrier is understood to be in general a module comprising an electrical-optical transmitter that emits light directionally in the form of a light beam, and comprising an optical-electrical receiver that receives said light and generates an electrical signal. A downstream detector or controller can thus immediately detect every interruption of the light beam and in this way a contactless detection of events can quickly and reliably be achieved. There are many applications for light barriers, such as monitoring of installations and dangerous areas. Light barriers also often are installed for contactless monitoring of conditions and procedures in technical equipment or devices. For example, light barriers are mounted in vending machines and self-service terminals to monitor the closed state of housing flaps, drawers or the like. In addition, in cash processing machines or ATMs light barriers are used for monitoring of transport processes that relate to the cash (banknotes or bills and possibly coins). In particular, the transport path starting from the separate banknote compartments to end in the cash dispenser of the ATM is monitored by several light barriers. For example, individual sections of the transport path each are monitored by a light barrier.

Basically, when using light barriers, the problem occurs that proper functioning is greatly restricted due to contamination, aging and other factors, so that often a regular maintenance of in-use light barriers is required. It is desirable to find a solution that ensures that the light barriers are working as long as possible and reliably even in pollution, wear out and the like.

DE 10 038 025 A1 discloses a method and a device for monitoring of a danger area equipped with light barriers. The reception brightness of the individual light beams is detected. A light barrier is rated as "free" if its reception brightness is above an upper threshold, and is rated as "interrupted" if the reception brightness is below a lower threshold value. Light beams are regarded as "weakened" if their receiving brightness is between the two thresholds. The "weakened" light beams can be assigned to the condition of "free" or "interrupted" depending from the particular application.

DE 10 2005 047 337 A1 discloses a method for adjusting brightness thresholds in a light-sensitive sensor that serves as a presence detector or a person presence sensor. The method enables the switching of an illumination in dependence from the current illumination condition in a room or at a workplace, and comprises the following steps: storing a current/voltage/Lux-characteristic in a micro-controller; transmitting a predetermined Lux value for the workplace to the micro-controller; measuring the current lux value at the workplace; transmitting the measured Lux value to the micro-controller. Then incremental changes (increase or decrease) are applied to the load resistance of the light-sensitive sensor, by selecting highs and lows of the micro-controller's output or shift register output, until the measured (manipulated) voltage value of the total load resistance of the light-sensitive sensor is equal to the voltage value of the current lux value that is stored in the micro-controller. Then the determined high/low-conditions (bit patterns) are stored in an EEPROM and the determined resistance value is permanently set. Accordingly, an initial calibration of light barrier can be achieved at the receiving side.

Accordingly, methods and devices for controlling at least one light barrier are known where a current receiving level is determined in dependence from the received light. A control circuit is used to check whether the current reception level falls below a lower threshold or exceeds an upper threshold value to determine whether the light barrier is interrupted or not.

With the known methods, the detection areas can be pre-determined exactly by means of thresholds. However, this does not prevent reduced functional capability during a possibly long-term operation of the light barrier, for example due to dirt, wear, aging and the like. This is particularly a problem when the light barriers are used in slightly dirt environments of machines, self-service terminals or similar devices.

The object of the present invention is to improve a method for controlling at least one light barrier so that said disadvantages are overcome in an effective manner. In particular, a method as mentioned before shall be improved so that even over a prolonged period of operation the functional capability or performance will not markedly be deteriorated.

SUMMARY

Accordingly, the method presented here is characterized in that, for deciding whether the light barrier is free or interrupted, the thresholds initially are adjusted in dependence from a predetermined minimum reception level such that each of the thresholds is a fraction of the minimum reception level, wherein an allowable reception level range is defined between the minimum reception level and a predetermined saturation reception level, and wherein in a first sequence of steps it is checked whether the current reception level is outside the allowable reception level range, and if this is the case, that in a second sequence of steps at least a parameter for the operation of the optical transmitter is calibrated in dependence from the minimum reception level and/or the saturation reception level. Thus a calibration of at least one operating parameter, such as an operating current of an optical transmitter device, particularly of a transmission LED, is performed on the transmitter side when the reception level measured at the receiver side moves out of the allowable range. Both thus are performed, the definition of the allowable reception level range as well as the calibration at the transmitter side in dependence from the predetermined minimum reception level and/or the pre-determined saturation level.

One or more operation parameters that particularly indicate an operating current or current stage for the optical transmitter are calibrated by calculating a gradient of one characteristic curve of the light barrier and by readjusting the parameter to a target value that is calculated in dependence from the gradient. The gradient may be calculated under the assumption that the respective characteristic curve starting from the zero point is linear first, so that the gradient is calculated by the following formula:

$$grad=RV*w/SC,$$

where RV is the current reception level, w is a weighting factor and SC is the adjusted parameter that particularly specifies the operating current, in particular the electrical current stage of the optical transmitter. The weighting factor w is optional and is, for example 1000. Due to the weighting it can be achieved that a floating-point computation is avoided and the calculation can be carried out mainly with integers, and hence the calculation can be carried out more quickly. However, essentially it is the assumption of a linear curve that greatly simplifies the calculation of the slope (gradient), thus speeding up, and with an acceptable margin of error.

In connection with the gradient-calculation the target value for the new parameter to be set (e.g. new current stage) may then be calculated according to the following formula:

$$TC=\{TVm+(SL-TVM)/2\}*w/grad,$$

wherein TVm is the minimum reception level; SL is the saturation reception level; w is a weighting factor and grad is the calculated gradient.

Preferably, in the second step sequence (if the current reception level is outside the allowable range) a parameter that indicates an operating current for the operation of the optical transmitter is calibrated in dependence from the minimum receiving level and the saturation reception level. For this purpose, for example, a current stage or level for driver stage of the optical transmitter is calculated from these two limits (minimum reception level and saturation reception level). Accordingly, if the current reception level deviates too much, the operation of the optical transmitter is controlled or recalibrated by the control circuit.

In addition, the threshold values, which initially at the beginning have been set or calibrated in dependence from the predetermined minimum reception level, then during operation they are re-calibrated in dependence from the current reception level if the current reception level should continue to be too low.

Also a control circuit operating according to the method is proposed. The control circuit is connected to the receiver or a downstream conversion stage and determines a value dependent on the received light current receiving level. The control circuit compares the current reception level with the two threshold values to detect an interruption of the light barrier. The control circuit also is connected to the optical transmitter or the transmitter with an upstream driver stage and controls the operation of the optical transmitter. For this purpose, the control circuit initially sets the two thresholds in dependence from a predetermined minimum reception level in such a way that the threshold values each correspond to a fraction of the minimum reception level (initial calibration). The range lies between the minimum reception level and a predetermined saturation reception level and is defined to be the allowable reception level range. The control circuit checks whether the current reception level is outside of this allowable reception level range. If this is the case, the control circuit re-calibrates at least one parameter for the operation of the optical transmitter, e.g. the operating current for the transmitter LED. Otherwise, the existing calibration remains unchanged.

The invention also relates to an arrangement comprising a light barrier and a control circuit according to the invention, as well as a self-service terminal equipped therewith.

The control can be realized by dedicated hardware (HW), by dedicated software (SW) or by a HW-SW-combination. The control circuit may be realized in at least one control unit, for example in one or more slave controller(s) that are connected downstream of the light barriers, and in a master controller that is connected to the one or more slave controller(s). The slave controllers together with drivers and AD-converters and with the microcontroller are used for a hardware related evaluation of the light barrier signals and for conversion into events. The master controller is used to evaluate the events coming from the slave and to control the calibration. An available PC can be used to visualize the status (e.g. "dirt") and can be used for manual intervention in the control (e.g. manually triggering the calibration after cleaning/wiping the light barriers).

By the invention it is achieved that light barrier is still working reliably, even with attenuated light beam which may result from aging, soiling or moisture condensation on the optics and the like.

As already mentioned above, the control method may be configured so that in the second sequence of steps, a parameter for the operating current of the optical transmitter will be calibrated specifically in dependence from the minimum reception level and the reception level of saturation.

The current reception level may be checked in the second step sequence, in particular after the current operating parameter has been recalculated and adjusted/calibrated. For this purpose it is checked whether the current reception level (still) is less than the minimum reception level, and if this is the case, the thresholds (decision thresholds) are recalculated and readjusted depending on the current reception level; or otherwise the already set thresholds that have been set initially depending on the minimum reception level are used continuously.

Preferably, the lower threshold is set so that it is a fraction of (e.g., 30%-60%, in particular 50%) of the minimum reception level and corresponds (for the initial calibration) to 30%-60%, in particular 50%, of the current reception level (for any recalibration); and that the upper threshold value is set so that it is a fraction of (e.g., 60%-90%, in particular 70%) of the minimum reception level (for the initial calibration) or 60%-90%, in particular 70%, of the current reception level (for any recalibration). In addition, the upper threshold value may be adjusted so that it is at least 10%, in particular 20%, higher than the lower threshold. In the embodiment later described in detail, the lower threshold is calculated at 50% and the upper at 70% of the reception level, either based on the min. reception level=minTargetValue (600 digits) or based on the current reception level=receiverValue, whichever is less. The hysteresis (distance between the two thresholds) should preferably be 20%. This results in fixed thresholds of 420/300 digits as long as the reception level is above the minTargetValue. Then the current reception level (receiverValue) is used for calculation.

In the event that the current reception level is above the saturation reception level, the calibrated parameter (e.g. the operating current) may be reduced successively for the optical transmitter until the current reception level at the receiver falls below the predetermined saturation reception level. This can be achieved by decrementing the current stage. In the embodiment described in more detail later, the decrementing is done by successively halving the current stages; this procedure is similar to a binary search, making it faster and closer to reality. The reason why one has to enter this control branch is often that a sensor has been pre-polished such that the receiver device gets into a supersaturated state. It is also assumed in this case that the control has to be performed from a very high power stage to a very low one. A conventional (linear) decrementing takes a long time (the runtime grows linearly according to O-notation, i.e. with $O(n)$). The proposed halving can be realized in a significantly shorter runtime (The runtime grows according to O-notation with $O(\log (n))$.

The control method also may check in the second sequence of steps whether the light barrier, in particular the optical receiver, is covered. This is verified by calculating the slope (gradient) of a characteristic curve of the light barrier and by checking whether the slope is less than a minimum slope value. If this is not the case, the operation of the optical transmitter is controlled in the second step such that the parameter (operation current of the optical transmitter) is recalculated in dependence from the minimum receiving level and the saturation reception level and the gradient value and then is readjusted.

With the present invention, a control or regulation in the form of a self-adjustment is made possible, in which the reception level always is maintained in an as optimal an operating point as possible, so that neither under-control nor over-control occurs. The proposed light barrier control can be applied to multiple light barriers and ensure an optimum working point of all controllable analog light barriers. This applies, inter alia, to transport light barriers, compartment light barriers or clearance light barriers. Each light barrier can also be implemented as a module or sensor consisting of a transmitter and a receiver. The invention provides in particular the following advantages:

- operation with the lowest possible LED current, in order to minimize energy consumption and wear on the transmitters;
- operation always at optimum reception level to distinguish free light barriers from covered light barriers (even under limiting conditions such as ambient light or thin media);
- automatic compensation or balancing of dirt, wear, component and assembly tolerances;
- possibility of storage and use of the adjusted operating point beyond reboot and power-off;
- use of appropriate initial settings during the initial startup (if no adjusted operating point has been established yet).

With the present invention, each light barrier is set in an optimal way to the minimum necessary transmission current. This extends the life of the transmitter and that of the respective light barrier enormously. This also makes the power consumption to be kept at a minimum as possible, which is particularly important when a large number of controlled light barriers are used.

The invention is described in detail with reference to embodiments and with reference to the accompanying figures representing the following schematic drawings.

DETAILED DESCRIPTION

In the following, reference will be made to FIGS. 1-6 in common, wherein in particular FIG. 5 will be explained first, the figure shows, by means of a block diagram, the structure of a light barrier that is connected to a control or adjusting circuit according to the invention.

Figure 5:
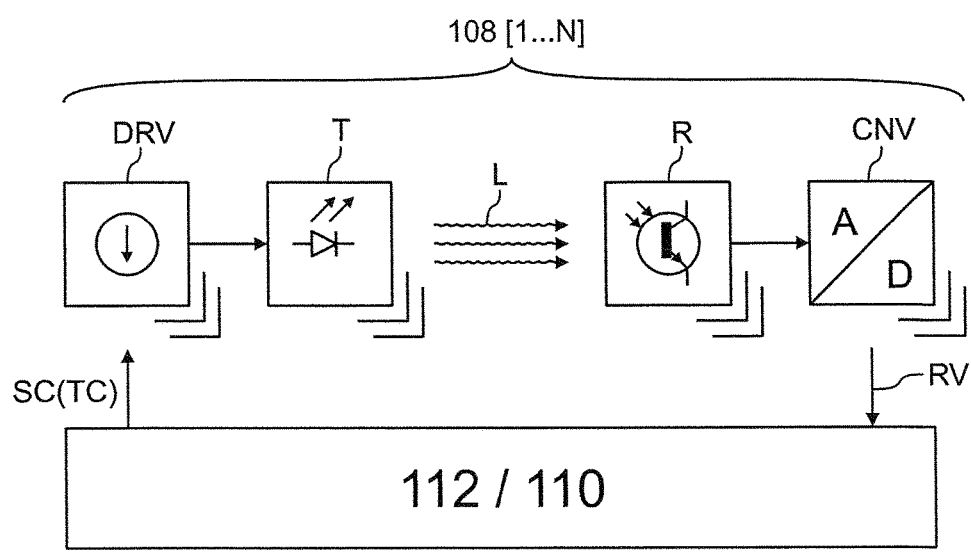
FIG. 5 shows a block diagram of a light barrier with a controller according to the invention.

Exemplary of several light barriers the FIG. 5 shows an arrangement with one light barrier 108. The light barrier basically contains an electro-optical transmitter T and an electro-optical receiver R that receives the light beam L generated by the transmitter. Any optics that are used at the transmitter and receiver sides are known per se and therefore will not be shown or described here in detail. As a transmitter T there can be used e.g. light emitting diodes (LED), in particular IR-LEDs which operate in the infrared range. For particularly precise light barriers there can be used e.g. laser diodes as well. As a receiver R there can be used e.g. photodiodes or phototransistors or for simpler applications also photoresistors.

As FIG. 5 shows, the transmitter T is operated, for example, via a driver stage DRV that is controlled by a control circuit 110. In particular, the control circuit 110 outputs, as a control parameter, a variable current stage SC that determines the level of the operating current for the transmitter T. Thus, transmitter LEDs can optimally operate, i.e. operate with a constant current that is adjusted as possible to the current stage. A simple resistor would not be enough, especially as the supply voltage is not exactly the same on all LEDs. The different voltages may result in an automatic or self-service terminal already due to different cable lengths. To avoid this problem, the LEDs preferably are powered by current sources. For this purpose, an integrated driver module can be used that can adjust the current in, for example, 127 steps from darkness to the maximum brightness.

On the receiver side the receiver connected downstream to an analog-to-digital converter CNV that converts the output signal from the receiver R or its reception level RV from an analog value into a digital value and that provides it to the control circuit 110. The control circuit 110 processes the reception level RV and depending on this it decides on whether and how the current stage SC shall be changed for operating the transmitter T. In an alternative embodiment, one driver stage may drive multiple transmitters T and a combined analog-digital converter stage CNV may process signals from the multiple receivers T.

The arrangement described in more detail below is particularly, but not exclusively, to be incorporated into self-service terminals, such as into ATMs or POS systems, and can also include a plurality of light barriers that are monitored jointly by a control circuit. A drive according to the invention is conceivable in all places, where a combination of a controllable optical transmitter (e.g. LED) and a receiver (e.g. photo-transistor) is used as a light barrier.

Figure 1:
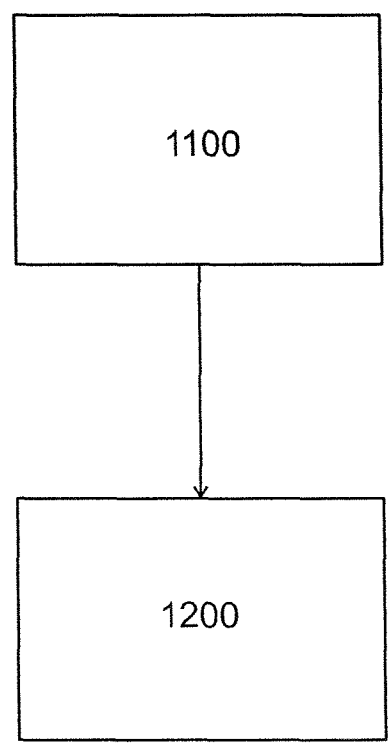
FIG. 1 shows a simplified flow chart for a method according to the invention.
Figure 2A:
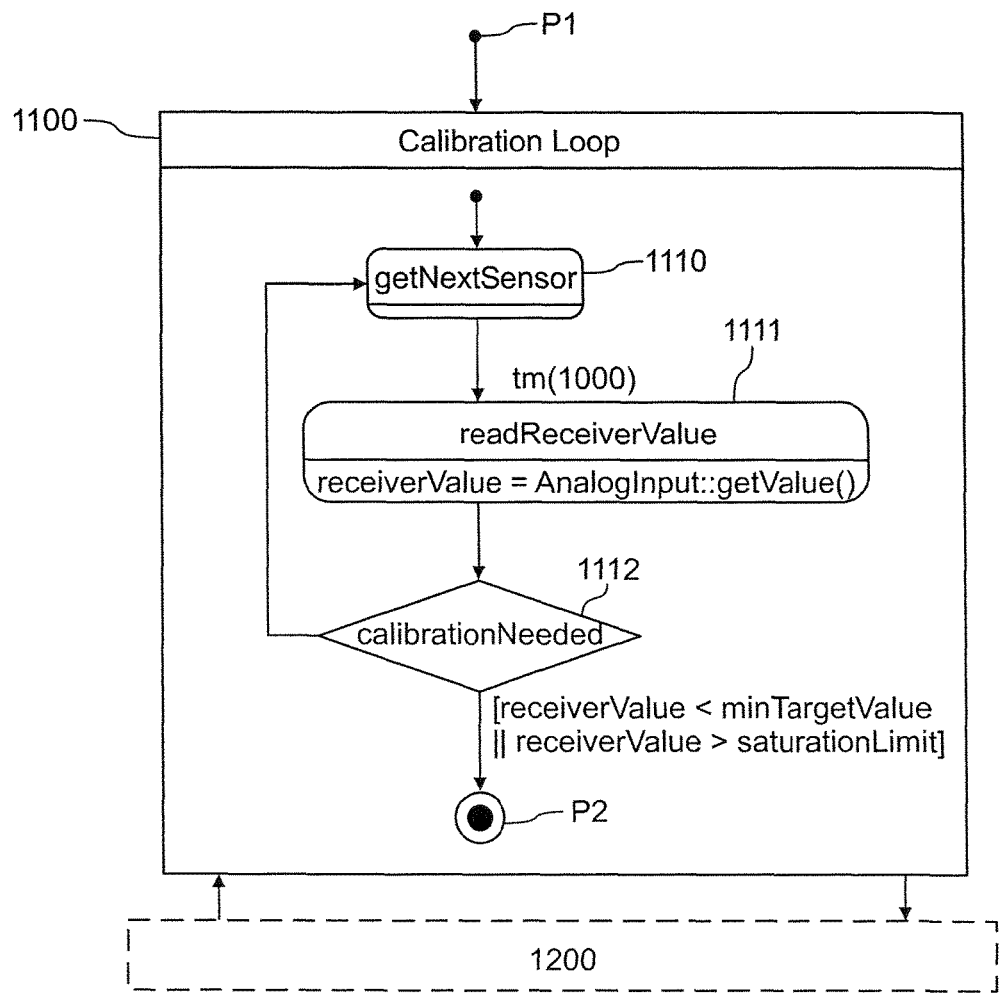
FIG. 2a shows in more detail a first sequence of steps of the method.

The arrangement, in particular, the control circuit 110, operates according to the inventive method that can be explained with reference to FIGS. 1, 2a and 2b:

As FIG. 1 shows, the inventive method 1000 for controlling at least one such light barrier (see 108 in FIG. 5) is divided into two schematic blocks 1100 and 1200, of which the first block 1100 includes a first step sequence in which it is checked, by means of the current reception level (see also RV in FIG. 5), whether the operation of the transmitter T has to be controlled with adjusted parameters or not. In particular, it is checked whether a parameter for the operation of the optical transmitter has to be calibrated. In the example described here, the operating current or the current level (see SC in FIG. 5) of the optical transmitter T is controlled and re-calibrated, if necessary. At first, in the first sequence of steps for block 1100, it is decided whether the parameter has to be re-calibrated which is illustrated in FIG. 2a in detail:

Starting from a point P1, which marks the state of the initially calibrated (e.g. factory calibrated) light barrier, it shall be checked in the 1100 block per light barrier whether the actual calibration is maintained or whether a new calibration should be performed. For this purpose, the reception level RV is measured at the receiving end in a first step 1110 for each light barrier. Hence, in step 1111 the reception level is read out as a digital value from the A/D converter CNV and then it is checked in step 1112 whether the actual value lies within a permissible range or not. If the current reception level RV is out of range, the procedure moves to the point P2 and performs a new calibration of the light barrier in block 1200 (see also FIG. 2b). The check is performed continuously for all existing light barriers.

Figure 3A:
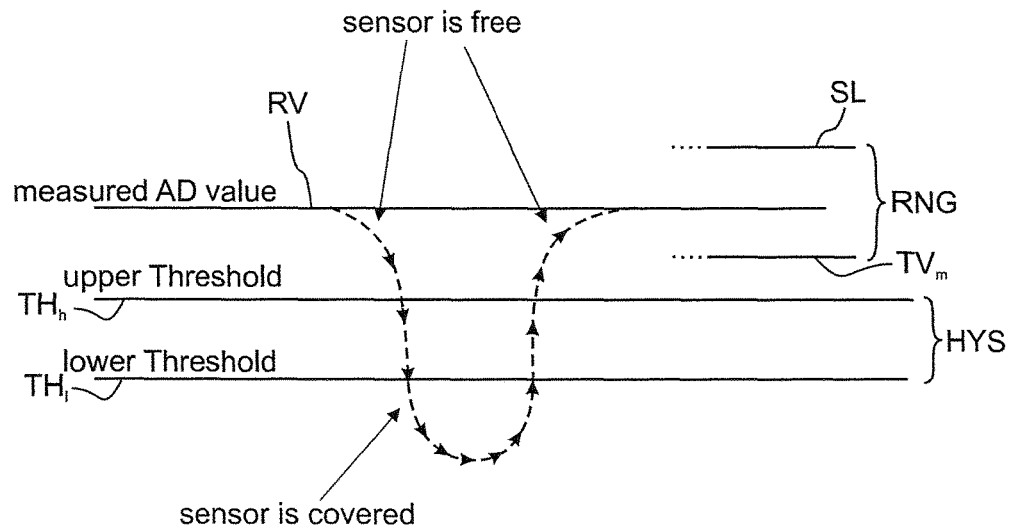
FIG. 3a and FIG. 3b illustrate the time course of the reception level for various light barrier conditions.

The allowable receiving level range (see also RNG in FIG. 3a) is located between a saturation level SL that marks the upper limit at which the receiver is in saturation, and a minimum reception level TVm that marks the lower limit for the useful reception level generated by the receiver. The current reception level TV should possibly be in the middle of the range RNG. FIG. 3a also shows two thresholds, namely a lower threshold or limit value (TH1) that is e.g. 50% of the minimum reception level TVm, and an upper threshold or limit value (THh) that is e.g. 70% of the minimum reception level TVm. The thresholds define a hysteresis HYS. These limits will be explained in more detail later with reference to FIGS. 3a and 3b.

Figure 2B:
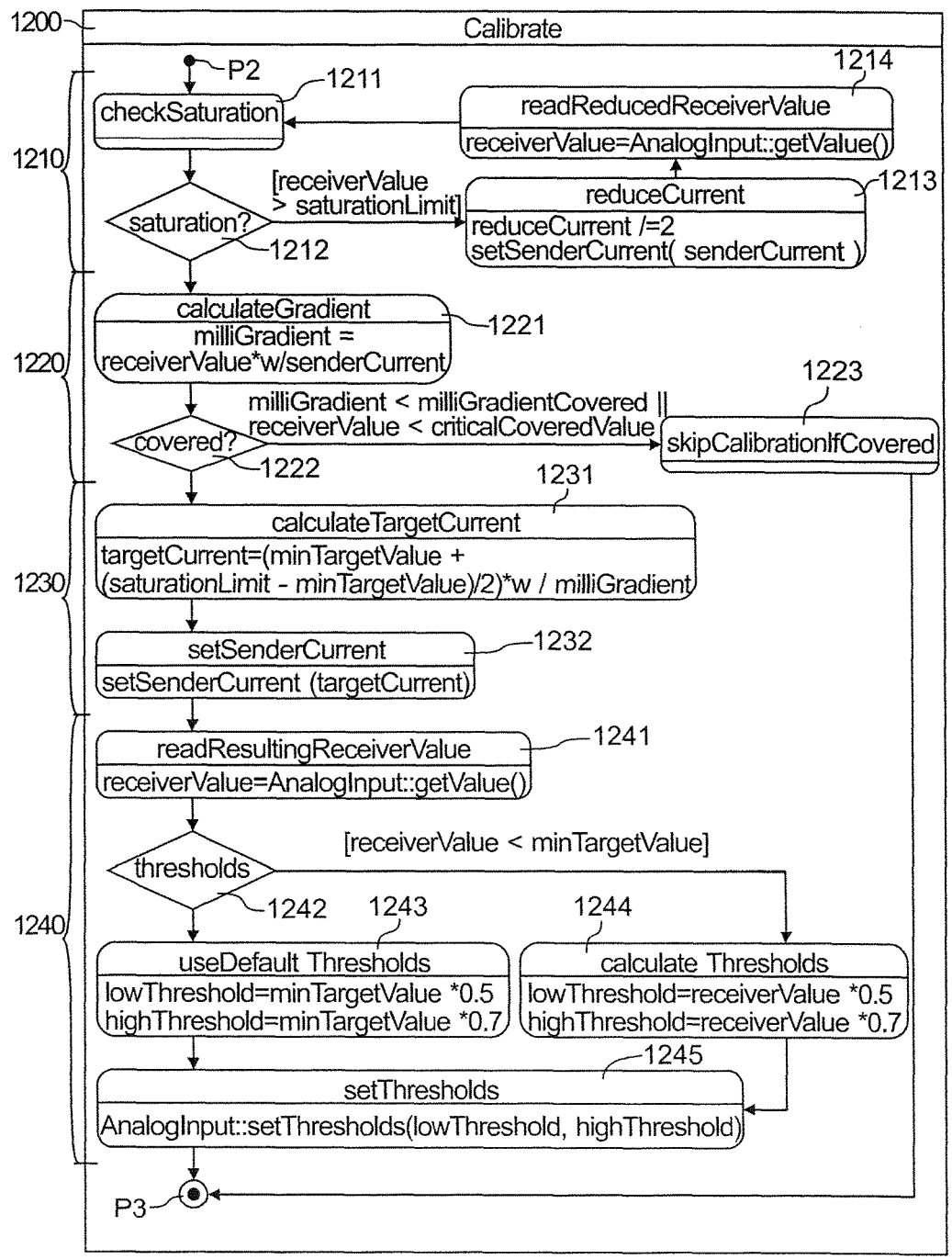
FIG. 2b shows in more detail a second sequence of steps of the method.

FIG. 2b illustrates the block 1200, which in effect comprises the steps for controlling and re-calibrating the light barrier. The block 1200 is described in more detail below. Starting from the point P 2, in a first sequence of steps 1210 it is checked by means of the current reception level RV, whether the receiver R is in a state of saturation or not (step 1211). As the criterion a determined saturation level SL is used, with which the current reception level RV is compared in step 1212. If RV is larger than SL, the receiver is in saturation and in a step 1213, the actual used current stage SC is reduced, i.e. the operating parameter considered here is reduced. This is achieved for example by halving the present current stage. Alternatively, this could be achieved by dividing the present current stage by a divisor of 4, 8 or multiples thereof. Thereafter, the reception level RV is then measured again in step 1214 to see if the receiver is still in saturation. The reduction/halving of the current stage SC is repeated successively until the reduced reception level RV is below the saturation level SL.

If this is the case, i.e. there is no saturation, then the light barrier will be checked in the next sequence of steps in 1220 to find out whether its function is affected by covering or blocking-out the light beam or the like. The invention is based on the finding that a cover (even partially) of the light beam or an attenuation of the light can be verified at the receiving end by determining and evaluating a gradient of a characteristic of the light barrier. This criterion will be described with reference to FIG. 4.

Figure 4:
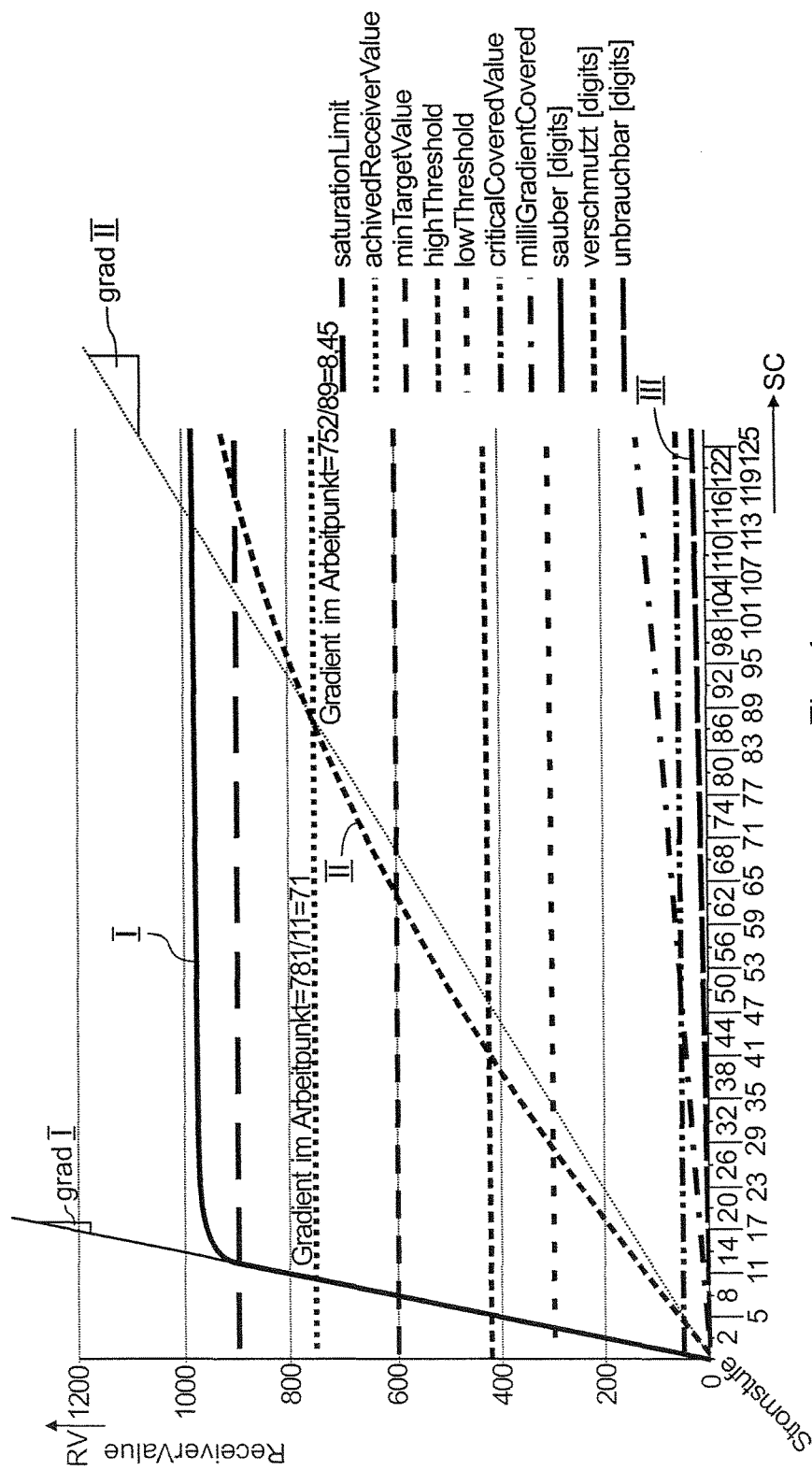
FIG. 4 shows a set of characteristic curves of the reception level in response to different transmit current stages and conditions of the light barrier.

In the exemplary FIG. 4 there are shown several characteristic curves in the form of a set of characteristic curves, in which the reception level RV (values range from 0 . . . 1023) is plotted against the used current stages SC (value range 0 . . . 127). The specified values refer to digital units (digits); for the reception level RV, the highest value of 1023 digits can for example represent a few volts (V); for the current stages SC, the highest value of 127 digits can for example represent a few milliamperes (mA). The relationship of the digits to the physical quantities is non-linear in practice. Thus, one cannot say that 1 digit corresponds for example to 1 V or to 1 mA. The physical quantities are not relevant to the control or adjustment, since the calculation of the parameters (e.g. the current stages) is performed in digits.

Generally the reception level RV increases with increasing current level, or stage SC, until it reaches a saturation region (saturation level at about 900). Thereafter, the reception level remains at this saturation level. For a free, non-covered or attenuated light barrier the characteristic marked by numeral I is typical, according to which the reception level rises steeply at first RV with a linear slope to near the saturation level. In the exemplary FIG. 4 starting with the lower current stage range from 0 to 14 (digits), the reception level RV increases from 0 to 900 (digits). Then RV migrates to a transition region (14<SC<17) and enters into saturation at about 900 and remains at that level. The slope of RV in the starting area of the characteristic curve I is referred to herein with gradI and amounts for example in the operating point (781−0)/(11−0)=71.

As the exemplary FIG. 4 shows, the reception level RV increases with attenuated light barrier (characteristic II) significantly weaker at (gradII), the gradient of the operating point here is (752−0)/(89−0)=82.45. When the light barrier is covered, RV rises barely and the gradient is well below one. If now the slope of the reception level RV is not big enough, but is below a predetermined minimum slope value (milliGradientCovered=1), then this is detected as an indication of a (partial) covering of the light barrier. The further control and/or calibration of the light barrier can be omitted (see step 1223 in FIG. 2b).

FIG. 2b illustrates a sequence of steps 1220 in which the test is performed to check whether or not the light barrier is covered. First, in step 1221, the gradient of the reception level RV is calculated in the current operating point. For this purpose, the following formula can be used:

$$\mathrm{grad}=RV*w/SC$$

See for example gradI in FIG. 4, where the gradient is calculated in the current operating point based on the quotient RV=781/SC=11 and therefore has the value of 71. To increase the resolution of the calculation it is assumed that w=1000. This allows use of a microcontroller with integer calculation (performance).

Next, in step 1222 the present calculated gradient is compared with the predetermined minimum slope value milliGradientCovered. If the present gradient (e.g. III in FIG. 4) is below, it is assumed that the light barrier is covered and that no further calibration of the light barrier shall be performed (step 1223). Additionally or alternatively, it can also be checked whether the reception level is less than a predetermined RV minimal or critical reception level criticalCoveredValue. However, if the calculated gradient is greater than the value milliGradientCovered and/or if the present reception level is greater than the value criticalCoveredValue, the system assumes that there is no coverage of the light barrier, and the method proceeds to step 1231 for setting the current stage.

The current stage SC is thus adjusted within the series of steps 1230 and in particular in steps 1231 and 1232. In the first step, a target value TC (target current) for the current stage is calculated. For this purpose, the following formula is used:

$$TC = TargetCurrent = \{TVm + (SL-TVM)/2\} * w/grad$$

The target value TC is thus dependent on the minimum reception level TVm and the saturation level SL as well as on the measured slope grad. The formula reflects an extrapolation of the gradient in the present operating point, by which the target value is calculated for the current stage. Then, in step 1232, the current stage is adjusted in dependence from the calculated target value TC. The primary goal of the control concept is to have the target value as centrally as possible within the range RNG (s. FIG. 3*a*) in order to have the maximum distance to the saturation level SL and the maximum distance to the minimum reception level TVm.

The method then proceeds with the step sequence 1240 in which the reception level RV actually achieved shall (again) be verified to decide whether the control of the light barrier is based on the existing thresholds or needs to be based on new thresholds that are to be calculated:

In step 1241, the new reception level RV is determined at first; then it is compared in step 1242 with the minimum reception level TVm. If the reception level RV is at least as large as or larger than the minimum reception level TVm, the previous thresholds can still be used (step 1245). Otherwise, the thresholds are recalculated (step 1244).

Thus, if the present reception level is too low (RV<TVM), then a new calibration is done by changing the following thresholds: an upper threshold THh and a lower threshold TH1. Both threshold values are dependent on the reception level; they each correspond to a fraction of the reception level. It should be noted that at a first adjustment of the system (initial calibration, e.g. in the factory) the thresholds each correspond to a fraction of the minimum reception level TVm. However, if a re-calibration (step 1244) is performed, the threshold values each are calculated to be a fraction of the current reception level RV; the current reception level RV therefore replaces the minimum reception level TVm. For example, the lower threshold TH1 is about 50% of TVM or RV. And the upper threshold THh is about 70% of TVM or RV. The percentages of 50% and 70% are preferred values that can be used with almost all light barriers. Theoretically, a third reduction would be ideal to get a maximum signal-to-noise ratio and a maximum hysteresis. Since in practice, the reception level electrically never is exactly 0V and a medium (particularly a thin medium) can never absorb 100% light (see also characteristics III in FIG. 4), a greater signal-to-noise ratio should be allowed downwards. Therefore, instead of the theoretical ideal percentage values of 33% and 66%, the percentage values of 50% and 70% are used here. It is ensured that THE is always greater than TH1 by at least 10%.

Figure 3B:
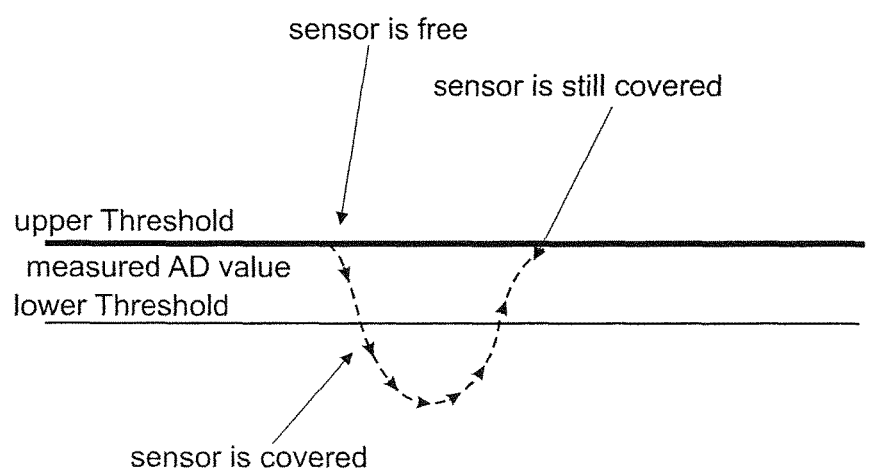

What is going on with the thresholds THh and THh, will be particularly apparent with reference to FIGS. 3*a* and 3*b*. FIG. 3*a* shows the variation of the reception level RV, which should only be changed if possible within the allowable range RNG. If the reception level RV decreases below the lower threshold value THL, one can assume that the light barrier is not free or that the receiver is hidden. When the reception level RV then increases again, namely above the upper threshold value THn, then one can assume that the light barrier is free or clear again. The thresholds define a hysteresis HYS. Thus, by means of the hysteresis HYS it can be verified reliably, in a fully-functioning light barrier, if an object interrupts the light beam or not (no more). Thus also moving objects (transported bills) can be detected reliably. This is illustrated by FIG. 3*a*.

The reception level RV may never go above the upper threshold THh if the light barrier function affected by dirt, aging, etc. This is illustrated by FIG. 3*b*. Although the light barrier is not interrupted, so should be free, the reception level RV reaches a level that is only slightly or barely above THh. When now the observed object enters the area of the light beam, the reception level RV falls even below the lower threshold TH1 and it can be recognized "light barrier interrupted". While the object then leaves the area of the light beam, the reception level RV increases. However, due to dirt/covering the reception level RV cannot exceed clearly enough the upper threshold THh. Thus, the system cannot reliably detect the condition of "free light barrier (again)".

The present invention also solves this problem in that the thresholds TH1 and THh are optionally re-adjusted (see step 1244 in FIG. 2*b*). Thus, the system operates reliably even when the exterior becomes dirty, insofar as this is still possible. However, if the light barrier is very dirty or is completely covered, this is detected in the step sequence 1220 and then calibration will be omitted. In this event (step 1223) even the whole controller can be disabled until the system has been made fully functional again by maintenance.

With a moderate pollution, however, the system can still work reliably by applying auto-adjustment (step sequence 1240) to the thresholds THh and TH1. Here an emerging pollution is not only compensated by (slightly) lowering the thresholds depending on the current reception level. Even a disturbance that clears away (condensation on the optics with moisture) is managed by the system automatically in that the transmission power is then lowered again and the thresholds are optionally raised again.

The process control circuit (see 110 in FIG. 5) operating according to the method can be used for controlling of one or even several light barriers, particularly within machines and self-service terminals such as ATMs or POS systems. It should be noted here that the control can be realized by a dedicated hardware (HW), through a dedicated software (SW) or by any HW/SW combination.

The light barrier control ensures an optimal operating point of all controllable light barriers. These include light barrier for monitoring transport, movement, flaps, compartments or free space. The sensors preferably consist of a transmitter and a receiver. The control achieved inter alia the following advantages: the lowest possible LED current to minimize energy consumption and wear on the transmitters; optimum reception level to distinguish free light barriers from hidden or covered light barriers (even under limiting conditions such as ambient light or thin media); compensation of interference by dirt, wear, component and assembly tolerances; storage and use of the adjusted operating point beyond reboot and power-off; using appropriate initial settings during the initial startup (operating point has not yet been set).

An infrared diode preferably is used in the transmitter as the light source. The intensity of the light source can be adjusted in stages or stepwise. In most applications, an LED driver module having a 7-bit resolution (128 current stages) can be used; some light barriers or photoelectric sensors are built up discretely with transistor stages and thus have less power stages (2, 4, 8). At stage 0 the transmitter is off, no current flows and no light is emitted.

The receiver is, for example, an infrared phototransistor that supplies a voltage to the AD converter of the microcontroller. The AD converter contains e.g. a 10-bit AD converter (0 . . . 1023 digits). The system is adjusted so that the free light barrier produces a reception level RV that is at the upper end of the range, namely above 600 digits (THh). The covered light barrier produces a reception level RV that is considerably below TH1, usually close to 0 digits.

The following boundary conditions are taken into account. For the use of the invention in an analog light barrier there are analog measured values that are converted into digital signals (FREE/COVERED). This is done on the basis of thresholds. A hysteresis (HYS see in FIG. 3a) is provided to ensure that the digital signal is not constantly jumping back and forth at slightly fluctuating analog levels. The threshold THh and TH1 are now set so that the level of RV, when a medium is present, lies considerably below the lower threshold TH1, and clearly exceeds the upper threshold THh when no attenuating medium is present. Likewise the distance between these thresholds, constituting the hysteresis HYS, shall not be too small. If the level of free light barrier is sufficiently high and if the thresholds are chosen correctly, a reliable function is ensured (FIG. 3a). With increasing dirt or pollution, the reception level at the receiver RV decreases. Sometime the upper threshold THh would then no longer be exceeded. The sensor would then be continuously interrupted.

However, the presently disclosed light barrier control overcomes this problem and counteracts by readjusting, whereby the transmit current can be increased. Thus, the declining level RV at the receiver will be raised again. However, the readjustment cannot be made any old. There are several constraints and boundary conditions to be observed:

shutter/system is opened. Incident ambient light can interfere with the regulation jam or accumulation may block one or more light barriers when a defined period of time or number of transactions has elapsed one can assume that there is dirt or pollution It should here be noted that further implementation details are conceivable that determine how the boundary conditions can be detected and processed. Overall, however, the concept already tries, whenever possible, to automatically determine whether or not an adjustment shall be made (e.g. in case of a "covered photocell"). For those situations where a control would be more inappropriate, there is provided above the controller an instance that can disable the controller. To see now if there is such a situation or not, appropriate instances can be provided, such as digital light barrier that monitors the shutter or an instance that detects jam or accumulation of transported objects by detecting any excess of the supply current of the transport motors.

The presented functional principle aims to keep the reception level RV within the operation range from TVm=minTargetValue (default 600 digits) to SL=saturationLimit (default 900 digits). The hysteresis HYS is then set firmly in relation to TVm (minTargetValue). The default is TH1 (lowThreshold)=50% TVm (minTargetValue) and THh (highThreshold)=70% TVm (minTargetValue). If the target area is not reached/underrun, it is assumed that dirt or pollution occurs; by increasing the transmit current the reception level shall then return to the target range. If the target range is exceeded (receiver is in saturation) it is assumed that a dirty light barrier will probably have been cleaned. Then the current can again be reduced in order to minimize the wear of the transmitter.

FIG. 4 shows the characteristic curves of a light barrier at three provoked pollution degrees I, II and III (clean, dirty, useless), the diamonds represent measured values at the respective current stages. In addition, all limits/parameters which are relevant in the algorithm are indicated. This is e.g. the target area TVm (minTargetValue) to SL (saturationLimit) shown by the solid lines. The dotted line in the middle is the ideal achievedReceiverValue which is tried to be reached during the control procedure. The dashed lines indicate the thresholds THh and TH1 (upper and lower threshold). The dashed lines represent the transition towards the covered or hidden area. This limit is defined by the criticalCoveredValue (default 50) as an absolute value and further by milliGradientCovered (default 1000) as the slope of the characteristic curve.

The algorithm always calculates the slope (gradient) of the actual characteristic curve. So the current stage SC for reaching the target area can directly be calculated without the need to try every power in a linear way. This saves a lot of time. The estimation is intentionally linearly approximated in order to reduce the computational effort. The characteristics become strongly polynomial only with increasing dirt. In addition, the transmitter generates at the upper end always less light increase per current stage. Therefore, a precise determination of the current stage is not functionally relevant.

In addition, the slope (gradient) is used to detect whether the sensor is masked during the control. This is the case when the slope is smaller than milliGradientCovered. This has been verified empirically for dedicated light barriers by measurements. Since the resolution of the current stages as well as the reception level in each case in the lower area is low, it can happen that during the calculating of the gradient some quick and big jumps occur. Therefore, a masking should also be recognized at low current levels by the absolute limit value criticalCoveredValue. Then no control will be made when the sensor is covered or blocked.

To calculate the slope (gradient) correctly, the reception level RV should not be in saturation. This is, for example, the case when the sensor has just been cleaned. The transmitting current SC is still very high and is unhindered to arrive at the receiver. The level is outside the measurable range in saturation. To get the reception level again into the linear range, the transmitter current has to be lowered again. The correct current stage SC cannot be estimated or calculated here. A binary process is used so as not to have to search linearly. It is likely that a more huge current change is needed than a small one to obtain an appropriate reception level. The transmit current or power is reduced by constantly halving it until the reception level has fallen below SL (saturationLimit). Thereafter, the gradient can be calculated correctly again.

If even at maximum current stage the reception level TVm (minTargetValue) will not be reached, the thresholds must be adjusted in order to still make use of the sensor in the limits of very dirty contamination. For this purpose, the TH1 and THh (lower and upper thresholds) are adjusted in dependence from the current reception level RV instead of being set firmly in relation to TVm (minTargetValue). When the TH1 (lowerThreshold) falls below criticalCoveredValue the boundaries between pollution and darkening by a medium become blurred. In this case, the sensor will most likely report false-positive jams.

The light barrier disclosed herein operates essentially with two thresholds that define a hysteresis HYS, namely with a lower threshold TH1 (lowerThreshold) and an upper threshold THh (upperThreshold). These thresholds are based on a minimum reception level TVm (minTargetValue) (600 digits) calculated, namely TH1=50% TVm=300 digits and THh=70% TVm=420 digits. The system ensures that the operating range for the reception level RV, whenever possible, lies above the TVm (600 digits) and does not exceed the saturation value SL (SaturationLimit=900 digits).

In summary the control method proposed here can adjust the transmitter current at the transmitting side (IR-diode) in an intelligent manner; by way of example this can be done stepwise in predefined current stages (2, 4, 8, . . . ). Thus, on the receiving side (IR sensor/phototransistor) the reception level always arrives at an optimal operating point.

Figure 6:
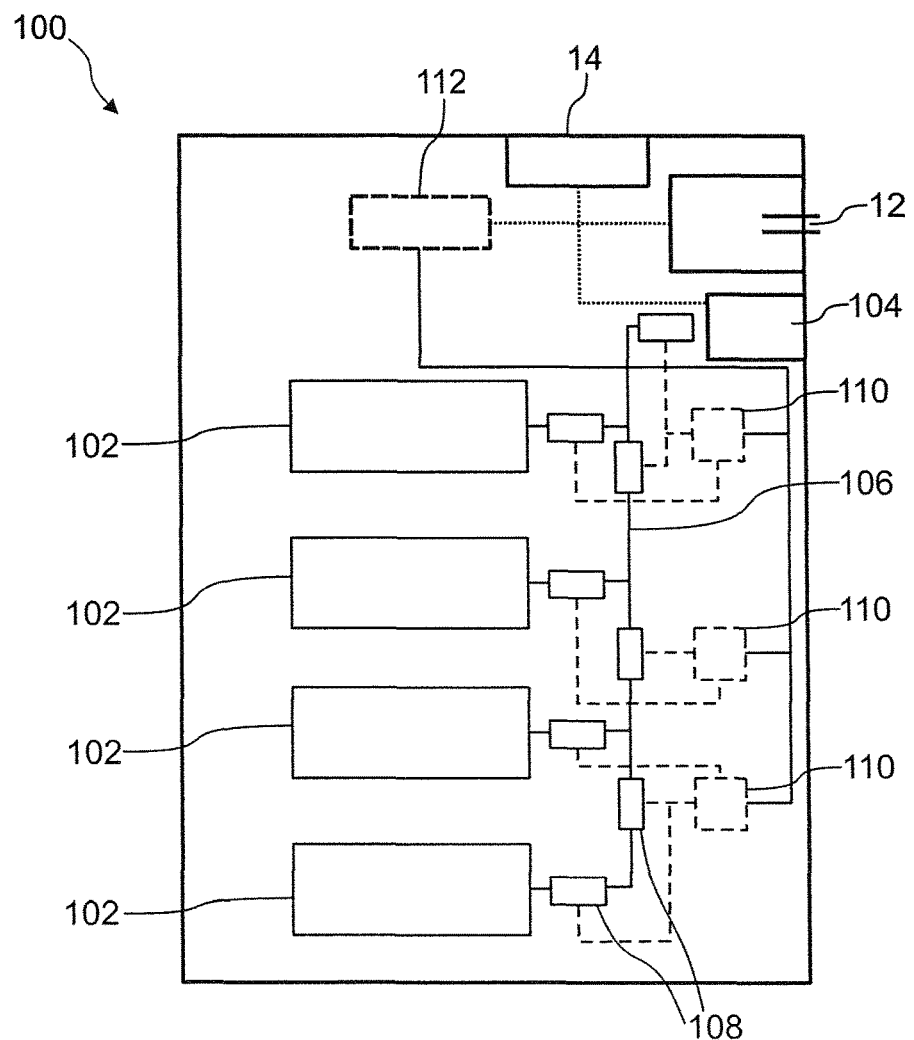
FIG. 6 shows in the form of a block diagram the structure of a self-service terminal which is equipped with a plurality of controlled light barriers according to the invention.

The invention can be realized in the firmware of a self-service terminal (in short also called SB terminal), such as in ATMs or POS systems, as it is schematically shown in FIG. 6: The self-service terminal is designed as ATM 100 and comprised particularly the following components:

A card input device 12; a user interface 14; several cash boxes 102 and an input and/or output unit 104. In addition, there is a transport path 106 between the cash boxes/cassettes 102 and the input and/or output unit 104 so as to transport the banknotes safely and quickly inside the ATM. To monitor the banknote transport there are several light barriers 108 installed. In the shown example here, there are two or three light barriers grouped together to be connected to a control circuit 110 that operates according to the control method being described above for calibrating the light barriers as needed. In the shown example here, there are a total of three control circuits 110 provided each of which is used as a slave controller of a main control unit 112 that serves as a master controller/PC of the self-service terminal.

The respective slave controller 110 together with the drivers and an AD-converters and the microcontroller are used for a hardware-related evaluation of the signals and for converting them into events. The MasterController 112 serves for evaluation of the events coming from the slave controllers and for controlling the calibration. The PC itself serves for visualization of the states/conditions (such as "pollution") and allows manual intervention in the control (e.g. manually initiating the calibration after cleaning of the light barrier(s)). The structure shown in FIG. 6 is only an exemplary architecture to realize the functions and combinations that have been explained with reference to FIG. 5.

The control concept works quickly and reliably. For this, the following regulation principles are observed or implemented:

The algorithm calculates the gradient of the actual characteristic curve (reception level against current stage). Hence, the required current stage for the target area (operating in the operating range) can be determined.

On the basis of the gradient it is also detected whether the sensor (receiver) is masked or covered. This is the case when the gradient is smaller than a defined value "milliGradientCovered". At a low current stage, this can further be checked on the basis of a lower limit "criticalCoveredValue". If the sensor is covered, no control is performed.

Before calculating the gradient (see I) it is checked whether the reception level is in saturation (>SaturationLimit). In this case, the transmitter current is lowered and that by iteratively halving it, until the reception level is again smaller than the saturation value "SaturationLimit".

It is also detected when the minimum reception level "minTargetValue" is no longer reached despite maximum current stage. The sensor is then in the border area of heavy contamination. In this case, the threshold values"lowerThreshold" and "upperThreshold" (see operation mode (O)) are adjusted in that they are not defined anymore in relation to "minTargetValue" (50% and 70% respectively) but are set in dependence from the actual reception level. In this way, it is tried to upheld the function of the light barrier even when being heavily soiled.

What is claimed is:

1. A method for controlling at least one light barrier, the method comprising the steps of:
   initially adjusting a lower threshold and an upper threshold based on a predetermined minimum reception level so that each of the lower and upper thresholds is a fraction of the predetermined minimum reception level;
   emitting light from an optical transmitter to an optical receiver;
   determining a current reception level based on light received by the optical receiver;
   checking whether the current reception level falls below the lower threshold or exceeds the upper threshold to determine whether the light barrier is interrupted;
   defining an allowable reception level range between the minimum reception level and a predetermined saturation reception level; and
   checking whether the current reception level is outside an allowable reception level range;
   when the current reception level is outside the allowable reception level range, calibrating at least a first parameter for the operation of the optical transmitter based on the minimum reception level and/or the saturation reception level;
   when the current reception level is above the predetermined saturation reception level, reducing the first parameter successively until the current reception level at the optical receiver is below the predetermined saturation reception level;
   wherein the step of calibrating at least the first parameter comprises the step of calibrating an operating current for the operation of the optical transmitter based on the minimum reception level and/or the predetermined saturation reception level; and
   wherein the step of calibrating the operating current further comprises the step of calculating a gradient of one characteristic curve of the light barrier and readjusting the first parameter to a target value that is calculated based on the gradient.

2. The method of claim 1, wherein, after calibrating the operating current for the operation of the optical transmitter, the method further comprises the step of verifying the current reception level by checking whether the current reception level is lower than the minimum reception level, and, if the current reception level is lower than the minimum reception level, the method further comprises the step of readjusting the lower and upper thresholds based on the current reception level, and, if the current reception level is not lower than the minimum reception level, the method further comprises the step of reusing the initially adjusted lower and upper thresholds.

3. The method of claim 2, wherein each of the readjusted lower and upper thresholds is a fraction of the current reception level.

4. The method of claim 1, wherein the gradient is calculated under an assumption that the respective characteristic curve starting from the zero point is linear first, so that the gradient (grad) is calculated by the following formula:

$$grad = RV*w/SC,$$

where RV is the current reception level, w is a weighting factor and SC is the operating current of the optical transmitter.

5. The method of claim 1, wherein the target value for the first parameter is calculated by the following formula:

$$TC = \{TVm + (SL - TVm)/2\}*w/grad,$$

where TVm is the minimum reception level; SL is the saturation reception level; w is a weighting factor; and grad is the calculated gradient.

6. The method of claim 1, further comprising the step of verifying if the light barrier is covered by checking whether the calculated gradient is lower than a minimum gradient value, and, if the light bather is covered, the method does not calibrate the first parameter for the operation of the optical transmitter, or, if the light barrier is not covered, the method further comprises the step of recalculating and adjusting the first parameter that indicates the operating current for the optical transmitter based on the minimum reception level, the saturation reception level and the calculated gradient.

7. The method of claim 1, wherein the lower threshold is adjusted so that the fraction is 30%-60% of the minimum reception level or current reception level, and the upper threshold is adjusted so that the fraction is 60%-90% of the minimum reception level or current reception level.

8. The method of claim 1, wherein the upper threshold is adjusted so that it is at least 10% higher than the lower threshold.

9. A control unit for controlling at least one light barrier that is used with an optical transmitter that emits light to an optical receiver, the control unit comprising:

an input connected to the optical receiver, the input configured to receive a current reception level in accordance with light received by the optical receiver;

a control circuit configured to check whether the current reception level falls below a lower threshold or exceeds an upper threshold to thereby determine whether the light barrier is interrupted;

an output connected to the optical transmitter for controlling operation of the optical transmitter; and wherein the control circuit is configured to adjust the lower and upper thresholds based on a predetermined minimum reception level so that each of the lower and upper thresholds is a fraction of the predetermined minimum reception level, wherein the control circuit is configured to define an allowable reception level range between the minimum reception level and a predetermined saturation reception level;

wherein the control circuit is configured to determine whether the current reception level is outside of the allowable reception level range, and, when the current reception level is outside of the allowable reception level range, the control circuit is configured to calibrate at least a first parameter for the operation of the optical transmitter based on the minimum reception level and/or the predetermined saturation reception level, the first parameter being operating current; and wherein, when the control circuit determines that the current reception level is above the predetermined saturation reception level, the control circuit is configured to reduce the first parameter successively until the current reception level at the optical receiver is below the predetermined saturation reception level; and wherein the control circuit is further configured to calculate a gradient of one characteristic curve of the light barrier and readjust the operating current to a target value that is calculated based on the gradient.

10. The control circuit of claim 9, wherein the control circuit is incorporated into at least one control unit comprising at least one slave controller that is connected to the at least one light barrier and a master controller that is connected to the at least one slave controller.

11. The control circuit of claim 9, wherein the input is connected to the optical receiver via a downstream analog-to-digital converter stage and the output is connected to the optical transmitter via an upstream driver stage.

12. A first light barrier comprising an optical transmitter and an optical receiver to which the optical transmitter emits light, wherein the first light barrier is connectable to the control circuit of claim 9.

13. A self-service terminal comprising the control circuit of claim 9 and at least one light barrier connected thereto, the at least one light barrier having an optical transmitter and an optical receiver to which the optical transmitter emits light.

14. The self-service terminal of claim 13, further comprising at least one slave controller that is connected to the at least one light barrier and a master controller that is connected to the at least one slave controller.

* * * * *